(12) United States Patent
Gates

(10) Patent No.: US 6,722,384 B2
(45) Date of Patent: Apr. 20, 2004

(54) FILTER DEVICE FOR FLUSH VALVES

(76) Inventor: Ronald L. Gates, P.O. Box 973, Coalville, UT (US) 84017

( * ) Notice: Subject to any disclaimer, the term of this patent is extended or adjusted under 35 U.S.C. 154(b) by 53 days.

(21) Appl. No.: 10/165,668

(22) Filed: Jun. 7, 2002

(65) Prior Publication Data

US 2003/0056833 A1 Mar. 27, 2003

Related U.S. Application Data

(60) Provisional application No. 60/296,966, filed on Jun. 8, 2001.

(51) Int. Cl.[7] ............................ E03B 7/07; F16K 31/385
(52) U.S. Cl. ......................... 137/15.01; 137/315.05; 137/549; 251/40; 210/430; 210/432
(58) Field of Search ...................... 137/549, 315.05, 137/15.01; 251/40; 210/429, 430, 432

(56) References Cited

U.S. PATENT DOCUMENTS

| | | | |
|---|---|---|---|
| 1,696,366 A | * 12/1928 | Smith | 137/549 |
| 3,911,796 A | 10/1975 | Hull et al. | 92/101 |
| 5,024,771 A | 6/1991 | Chiarito | 210/791 |
| 5,133,382 A | * 7/1992 | Nielsen | 137/549 |
| 5,332,192 A | 7/1994 | Whiteside | 251/40 |
| 5,335,694 A | * 8/1994 | Whiteside | 137/625.37 |
| 5,388,610 A | 2/1995 | Chuang | 137/549 |
| 5,582,205 A | * 12/1996 | McCarty et al. | 137/545 |
| 5,863,443 A | 1/1999 | Mainwaring | 210/800 |
| 5,887,848 A | 3/1999 | Wilson | 251/40 |
| 5,967,182 A | 10/1999 | Wilson | 137/544 |
| 6,408,873 B1 | * 6/2002 | Hall et al. | 251/40 |

* cited by examiner

*Primary Examiner*—A. Michael Chambers
(74) *Attorney, Agent, or Firm*—Thorpe North & Western

(57) ABSTRACT

A filter device and method for diaphragm type flush valves includes positioning the filter device in a cavity of the valve, between an inlet and an outlet pipe, and between an inlet and a bleed hole of a diaphragm of the valve. The filter device spans the entire span between an outlet pipe and a valve wall. Thus, all water entering the valve through the inlet passes through the filter prior to exiting through the outlet pipe, or prior to passing through the bleed hole in the diaphragm. The filter device can have a tubular or frusto-conical shape with a first, lower opening sealing about the outlet pipe, and a second, upper opening sealing against the valve wall.

21 Claims, 3 Drawing Sheets

FILTER DEVICE FOR FLUSH VALVES

This application claims the benefit of U.S. Provisional Patent application No. 60/296,966, filed Jun. 8, 2001.

BACKGROUND OF THE INVENTION

1. Field of the Invention

The present invention relates generally to flush valves, such as diaphragm type flush valves. More particularly, the present invention relates to a filter and/or strainer for flush valves.

2. Related Art

Flush valves, such as those used with toilets, urinals, or water closets, and other diaphragm valves, have a valve body with a diaphragm movably disposed therein. The valve body has an inlet, typically formed in the side of the valve body, and an outlet, typically formed in the bottom of the valve body. The outlet includes an outlet pipe that extends into the valve body. The diaphragm moves between closed and open positions. In the closed position, the diaphragm is disposed against the outlet pipe over the outlet, preventing the flow of water through the valve. In the open position, the diaphragm is disposed away from the outlet pipe and the outlet, allowing the flow of water through the valve.

The diaphragm separates the valve body into separate chambers with the outlet pipe disposed in one chamber, and the diaphragm displacing into the opposite chamber. The inlet opens into the same chamber as the outlet, but the flow of water is prevented by the diaphragm being disposed against the outlet pipe. A bleed hole is formed in the diaphragm to allow water to flow from the outlet, though the bleed hole, and into the opposite chamber, thus equalizing pressure on both sides of the diaphragm. The outlet pipe causes the opposite side of the diaphragm to have a greater surface area. Thus, the force on the opposite side of the diaphragm is greater, and forces the diaphragm against the outlet pipe, keeping the valve closed. To open the valve, water is bled from the opposite chamber, reducing the pressure and causing the diaphragm to move away from the outlet pipe, and allowing the flow of water from the inlet to the outlet.

One disadvantage with typical flush valves or diaphragm valves is their tendency to become inoperative due to debris or contaminants in the water that clog the bleed hole, or that foul the seal between the diaphragm and outlet. It will be appreciated that a clog in the bleed hole can prevent the diaphragm from returning to the closed position, and thus prevent the valve from shutting off. Similarly, fouling the seal between the diaphragm and outlet also can cause the valve to run. It will be appreciated that a running valve can cause substantial water damage. In addition, it will be appreciated that such valves can require significant maintenance.

Various solutions have been proposed. For example, filters have been disposed in the plumbing prior to the valve. One disadvantage with this proposal is that the plumbing surrounding a valve typically is fixed, and thus difficult and/or expensive to clean or service. Similarly, special plumbing fixtures with filters disposed prior to the valve have been proposed. Such special plumbing fixtures, however, add cost to installation, and are difficult or impossible to implement with existing fixtures. As another example, filters coupled to the diaphragm have been proposed. One disadvantage with such filters is that they can interfere with the operation of the diaphragm. In addition, such filter system can be complicated. Furthermore, such filters have little surface area and can be more easily clogged.

SUMMARY OF THE INVENTION

It has been recognized that it would be advantageous to develop a filter or strainer for use with valves, such as diaphragm valves, and with urinals, toilets or water closets, that is easy to install, does not interfere with the operation of the valve or diaphragm, resists clogging, requires less servicing, and is inexpensive to implement.

The invention provides a filter device for a valve, such as a flush valve. The valve can include a valve body with a valve wall, a cavity therein, an inlet extending through the valve wall into the cavity, and an outlet pipe disposed in the cavity with an abutment edge. A diaphragm assembly can be movably disposed in the cavity of the valve body. The diaphragm assembly can include a portion that moves between 1) a closed position in which the portion is disposed against the abutment edge of the outlet pipe, and 2) an open position in which the portion is disposed away from the abutment edge of the outlet pipe. The filter advantageously can be disposed in the cavity of the valve body between the inlet and the outlet pipe, and can span an entire span between the outlet pipe and the valve wall.

The filter device can include a filter body with a mesh material associated with the filter body. A first opening can be formed in the filter body with an inner peripheral edge sized and shaped to seal about the outlet pipe. An outer peripheral edge of the filter body can be sized and shaped to seal against the cavity wall. Thus, the filter body can be sized and shaped to extend across the cavity of the valve between the inlet pipe and the valve wall.

In accordance with a more detailed aspect of the present invention, the filter body can further include a tubular shell sized and shaped to fit in the cavity and around the outlet pipe. A second opening can be formed in the upper end of the shell, larger than the first opening, and sized and shaped to seal against the valve wall of the cavity.

In accordance with another more detailed aspect of the present invention, the tubular shell can have a frusto-conical shape.

In accordance with another more detailed aspect of the present invention, the filter device can have an inner seal disposed around the inner peripheral edge. The inner seal can include a flexible material.

In accordance with another more detailed aspect of the present invention, the filter device can include an outer seal disposed around the outer peripheral edge. The outer seal can include a flexible material.

In accordance with another more detailed aspect of the present invention, the filter body can further include an inner ring with the first opening formed therein, and an outer ring forming the outer peripheral edge. The mesh material can be disposed between the inner and outer rings.

In accordance with another more detailed aspect of the present invention, a seam can be formed by opposing edges of the mesh material. A rib can extend between the inner and outer rings, and can close the seam.

A method for filtering water in a valve can include the steps of positioning a filter in a cavity of a valve between an inlet thereto and an outlet pipe, and between the inlet and a bleed hole of a diaphragm of the valve. The filter can be sealed around the outlet pipe of the valve. The filter can span an entire span between the outlet pipe and a valve wall with the filter. The filter can seal against the valve wall. Thus, all water entering the valve through the inlet passes though the filter prior to exiting through the outlet pipe, and prior to passing through the bleed hole in the diaphragm of the valve.

Additional features and advantages of the invention will be apparent from the detailed description which follows, taken in conjunction with the accompanying drawings, which together illustrate, by way of example, features of the invention.

DETAILED DESCRIPTION

Figure 1:
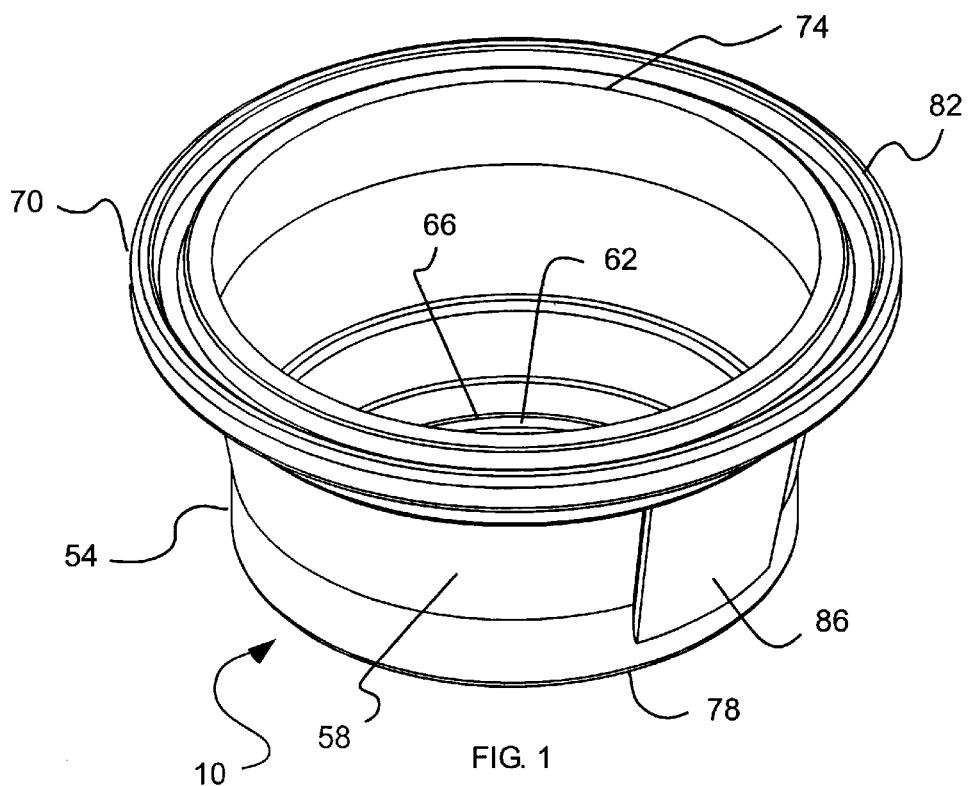
FIG. 1 is a perspective view of a filter in accordance with an embodiment of the present invention for use with a valve.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Figure 2:
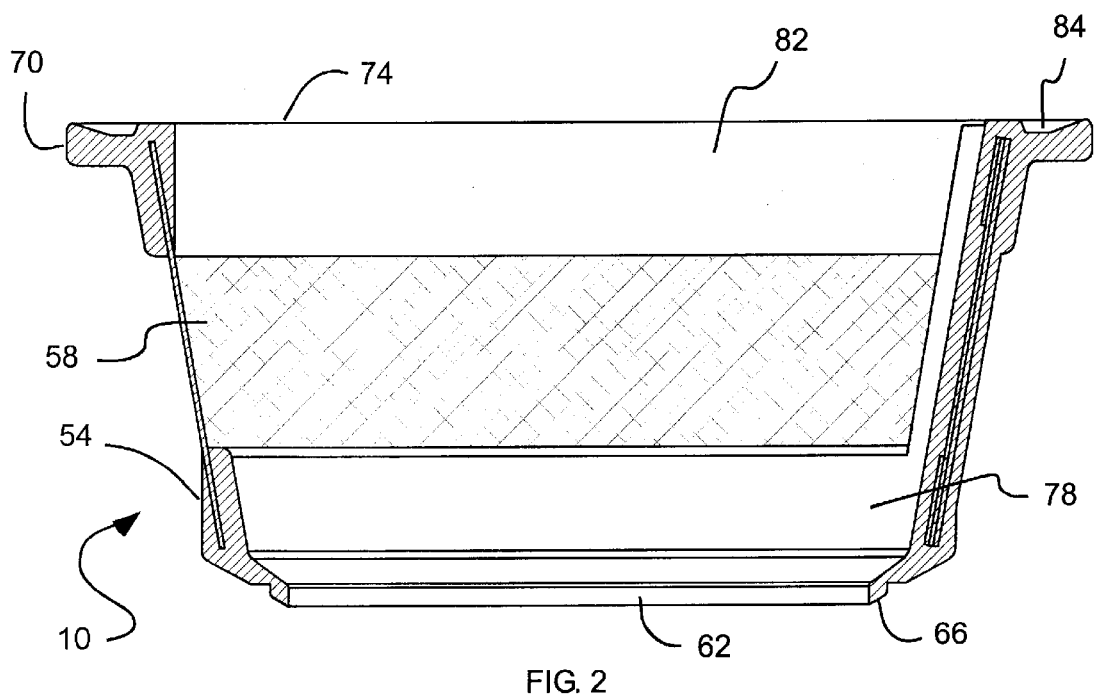
FIG. 2 is a cross-sectional view of the filter of FIG. 1.
Figure 3:
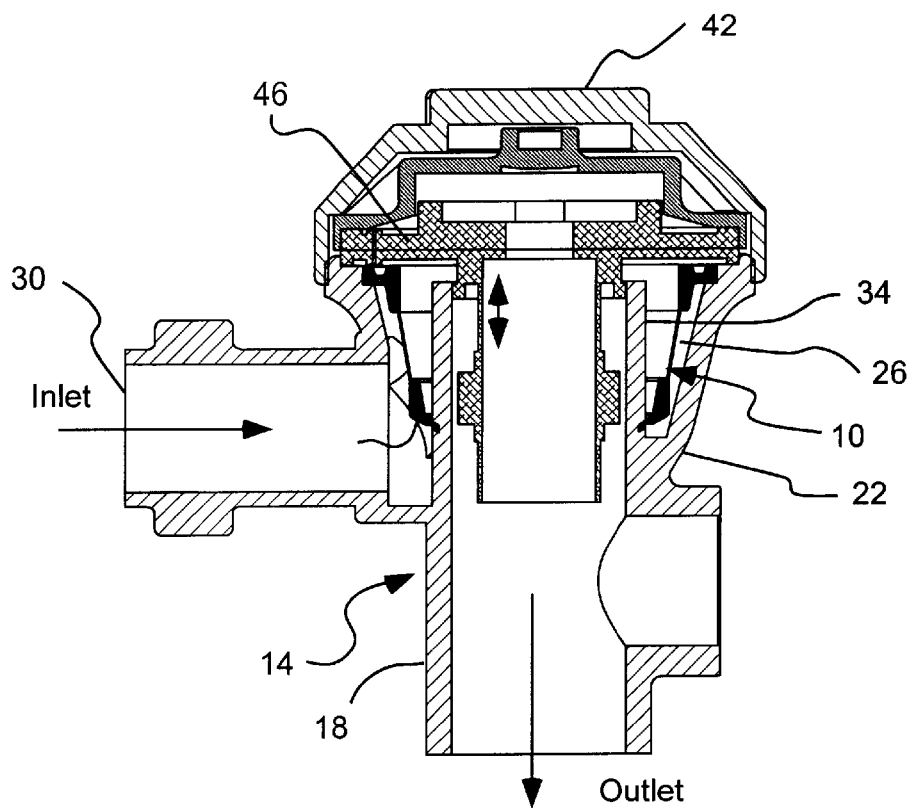
FIG. 3 is a cross-sectional side view of a valve with the filter of FIG. 1.
Figure 4:
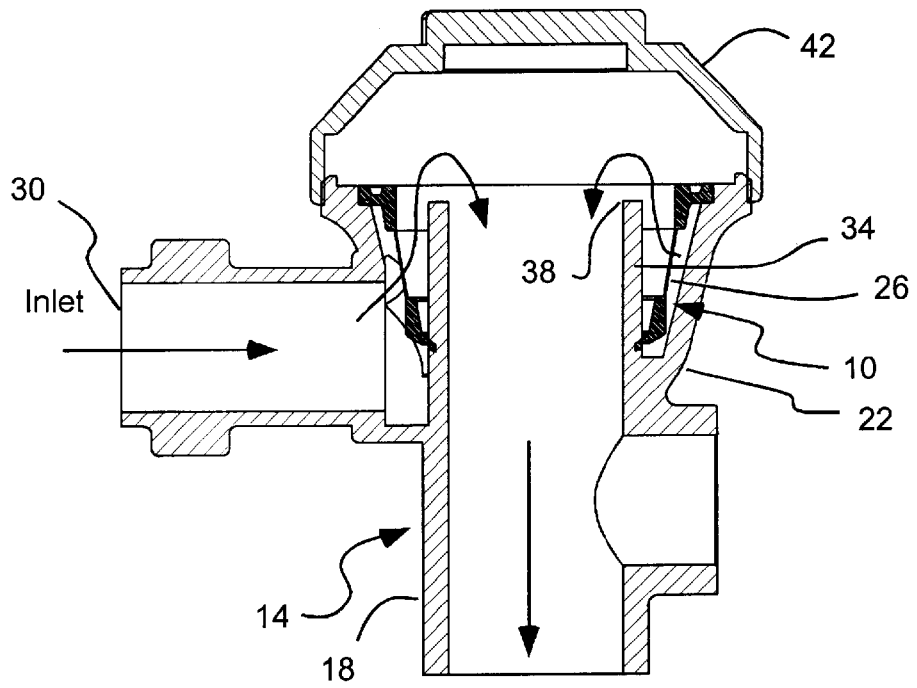
FIG. 4 is a partial cross-sectional side view of the valve of FIG. 3 with a diaphragm removed for clarity.
Figure 5:
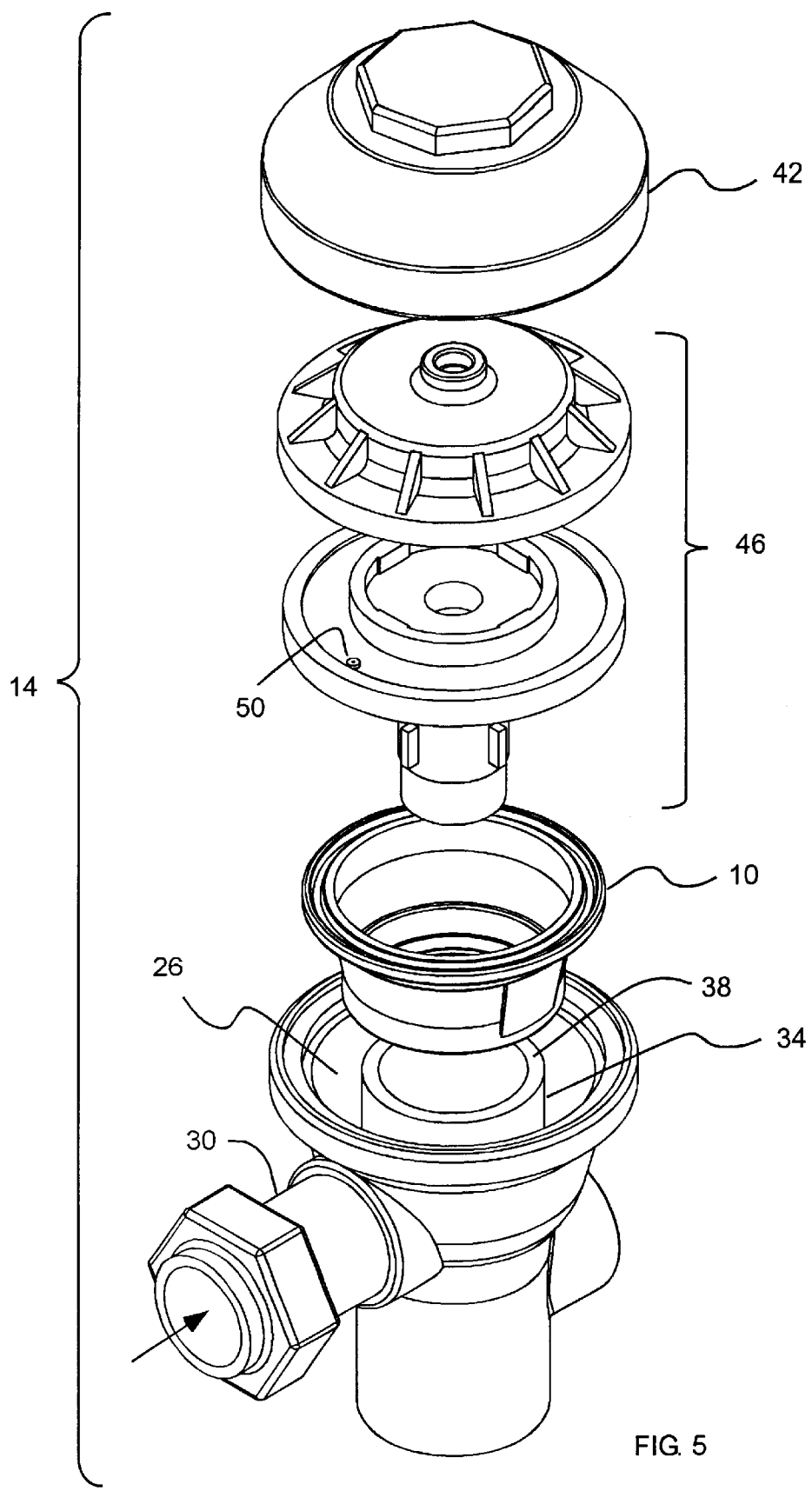
FIG. 5 is an exploded view of the valve of FIG. 3.

As illustrated in FIGS. 1–5, a filter or strainer device, indicated generally at 10, in accordance with the present invention is shown for use with a valve or valve device 14, such as a diaphragm valve. The valve device 14 can be a flush valve for use with a toilet or urinal. Toilets and urinals are fields that can benefit from the use of such a filter device 10. The terms "urinal" and "toilet" are used interchangeably herein to broadly describe any type of toilet or urinal. Although the valve 14 described herein is described with particular reference to flush valves for urinals and toilets, it is of course understood that the filter device 14 can be used with other types of valves for other applications.

The valve 14 can include a valve body 18 with a valve wall 22 defining a cavity 26 in the valve body. An inlet 30 can be formed in the valve wall 22 and can extend to the cavity 26 to allow fluid or water into the valve. An outlet pipe 34 can be formed through the valve wall 22 and can extend into the cavity 26 to allow fluid or water out of the valve. An abutment edge 38 can be formed on an inner or upper end of the outlet pipe 34 inside the cavity 26.

The valve 14 or valve body 18 can include first and second, or upper and lower, portions. The inlet 30 and outlet pipe 34 can be formed in the lower portion of the valve body 18. The valve 14 or valve body 18 can include a cap 42 secured to the lower portion of the valve body 18. A diaphragm assembly 46 can be movably disposed in the cavity 26 of the valve body 18. The diaphragm assembly 46 can include a flexible diaphragm that allows the assembly 46 to move within the cavity. An outer perimeter of the diaphragm can be captured between the portions of the valve body, with a central part moving up and down. At least a portion of the valve assembly 46 can abut to the abutment edge 38 of the outlet pipe 34.

The diaphragm assembly 46 can move between first and second, or closed and open, positions. In the closed position, the portion of the diaphragm assembly 46 abuts to the abutment edge 38 of the outlet pipe 34, preventing fluid or water from exiting the cavity 26 through the outlet pipe. In the open position, the portion of the diaphragm assembly 46 is disposed away from, or spaced-apart from, the abutment edge 38 of the outlet pipe 34, allowing liquid or water in the cavity 26 to exit through the outlet pipe.

The diaphragm or diaphragm assembly 46 can divide the cavity 26 into first and second, or upper and lower, chambers. The first or upper chamber is formed between the cap 42 or upper portion and the diaphragm. The second or lower chamber is formed between the diaphragm and the lower portion of the valve. A bleed hole 50 can be formed in the diaphragm or diaphragm assembly 46. Liquid or water can pass through the bleed hole 50 so that the liquid or water can be disposed on both sides of the diaphragm or diaphragm assembly 46. In the closed position of the diaphragm assembly, the liquid or water acts on substantially the entire upper surface of the diaphragm assembly, while the liquid or water acts on a smaller surface area on the lower side of the diaphragm assembly due to the outlet pipe 34 abutting the diaphragm. Thus, the pressure of the liquid or water exerts a greater force on the upper side of the diaphragm, forcing the diaphragm against the outlet pipe, and thus keeping the valve closed.

To operate the valve, the liquid or water is released or bled from the upper chamber, as is well known in the art. For example, a valve handle or actuator can open another opening in the diaphragm or diaphragm assembly allowing water to pass from the upper chamber and into the outlet pipe. Thus, the pressure is released from the upper chamber, and the pressure of the liquid or water in the lower chamber forces the diaphragm away from the outlet pipe, opening the valve and allowing water to flow out the outlet pipe.

To close the valve, the liquid or water is prevented from being released from the upper chamber. The liquid or water continues to bleed into the upper chamber through the bleed hole 50. The pressure in the upper chamber again forces the diaphragm against the outlet pipe, closing the valve. It will be appreciated that if the bleed hole 50 fails to operate, such as by being clogged by debris or contaminants in the liquid or water, the valve will remain open, wasting water and possibly causing damage.

The filter device 10 advantageously can be disposed in the cavity 26 of the valve 14 between the inlet 30 and the outlet pipe 34, and between the inlet 30 and the bleed hole 50 of the diaphragm. Thus, the liquid or water is filtered prior to the bleed hole 50 to resist clogging or fouling of the bleed hole 50. In addition, the filter device 10 advantageously can span an entire span between the outlet pipe 34 and the valve wall 22. Thus, the filter device 10 can cover the entire cavity 26 so that all the fluid or water entering the valve through the inlet 30 must pass through the filter device 10 prior to exiting through the outlet pipe 34, and prior to the bleed hole 50.

The filter device 10 has a filter body 54 with a screen or mesh material 58 to filter the liquid or water. The mesh material 58 can be formed of woven wires or fibers, or a grid of wires or fibers. Openings can be formed in the mesh material 58 between the wires to allow the liquid or water to pass through the filter device 10. The openings can be sized smaller than the size of the bleed hole 50 so that any debris or contaminants can be captured in the mesh material 58, as opposed to the bleed hole. In addition, the mesh material 58 can be relatively stiff to maintain the shape or form of the filter body 54. One or more apertures can be formed in the filter body 54 and covered by the mesh material 58.

The filter body 54 can be a tubular shell sized and shaped to fit in the cavity 26 and around the outlet pipe 34. A first or lower opening 62 can be formed in the filter body 54 with an inner peripheral edge 66 sized and shaped to seal about the outlet pipe 34. An outer peripheral edge 70 can be formed on the filter body 54 to seal against the cavity wall 22. The outer peripheral edge 70 can be formed around a second or upper opening 74 of the filter body 54. The filter body 54 or tubular shell thus extends across the cavity 26 from the inner peripheral edge 66 around the outlet pipe 34 to the outer peripheral edge 70 sealed against the cavity wall 22. Thus, the second or upper opening 74 can be larger than the first or lower opening 62.

In addition, the filter body 54 or tubular shell can extend from a bottom of the cavity 26 to the diaphragm. Thus, the filter body 54 or tubular shell can have a frusto-conical shape. The shape and configuration of the filter body 54 advantageously can maximize the surface area of the filter device or mesh material 58. It will be appreciated that the greater the surface area of the mesh material, the more openings or spaces exist, and thus the more debris or contaminants can be captured without completely clogging the filter. The filter body 54 or tubular shell advantageously extends both across the cavity 26 from the outlet pipe 34 to the cavity wall 22, and across the cavity 26 from the bottom of the cavity 26 to the diaphragm. Therefore, the area of the filter or mesh material is maximized.

The filter body 54 or tubular shell can include an inner and/or lower ring 78 and an outer and/or upper ring 82. The lower opening 62 and the inner peripheral edge 66 can be formed in the inner, lower ring 78, while the upper opening 74 and the outer peripheral edge 70 can be formed in the outer, upper ring 82. The inner peripheral edge 66 and the outer peripheral edge 70 can be flexible, and expandable radially to seal against the respective outlet pipe 34 and cavity wall 22. The edges 66 and 70, and thus the rings 78 and 82, can be formed of a flexible material. The lower opening 62 can be sized slightly smaller than the outlet pipe 34 so that the inner peripheral edge 66 expands to fit around and seal against the outlet pipe 34. Similarly, the outer peripheral edge 70 can be sized larger than the cavity 26 so that the edge 70 compresses to fit in the cavity and seal against the cavity wall. In addition, the edges 66 and 70 can be sized to be flexible, or can be thin to allow flexibility or expansion. A channel or groove 84 can be formed in the upper ring 82 so that the outer peripheral edge 70 can compress inwardly.

An opening or space can be formed between the rings 78 and 82. The mesh material 58 can extend between the rings 78 and 82. The rings 78 and 82 can be formed of plastic, and can be formed by injection molding. In addition, the rings can be formed or molded with the mesh material to secure the mesh material to the rings. The mesh material 58 can be cut into an elongated strip with opposite ends, and bent into a loop joining the opposite ends at a seam. A rib 86 can extend between the rings 78 and 82, and can extend along the seam to close the seam between the opposite ends of the mesh material.

The filter device 10 can be simply installed or inserted into the valve 14. For example, the cap 42 can be removed from the valve body 18, and the diaphragm assembly 46 removed from the cavity 26. The filter device 10 can be positioned in the cavity 26 around the outlet pipe 34, and between the inlet 30 and the outlet pipe 34. The lower opening 62 of the filter device 10 can be fitted over the outlet pipe 34 with the inner peripheral edge 66 sealing against the outlet pipe. The outer peripheral edge 70 can seal against the valve wall 22 so that the filter device 10 spans the entire span between the outlet pipe 34 and valve wall 22.

In addition, the outer peripheral edge may include an upper peripheral edge that seals against the diaphragm.

It is to be understood that the above-referenced arrangements are only illustrative of the application for the principles of the present invention. Numerous modifications and alternative arrangements can be devised without departing from the spirit and scope of the present invention while the present invention has been shown in the drawings and filly described above with particularity and detail in connection with what is presently deemed to be the most practical and preferred embodiments(s) of the invention, it will be apparent to those of ordinary skill in the art that numerous modifications can be made without departing from the principles and concepts of the invention as set forth in the claims.

What is claimed is:

1. A method for filtering water in a flush valve, comprising the steps of:
    a) positioning a filter in a cavity of a valve between an inlet thereto and an outlet pipe, and between the inlet and a bleed hole of a diaphragm of the valve;
    b) sealing the filter around the outlet pipe of the valve;
    c) spanning an entire span between the outlet pipe and a valve wall with the filter;
    d) sealing the filter against the valve wall, such that all water entering the valve through the inlet passes though the filter prior to exiting through the outlet pipe, and prior to passing through the bleed hole in the diaphragm of the valve.

2. A method in accordance with claim 1, wherein the step of positioning the filter further includes position a filter having:
    a) a filter body;
    b) a mesh material, associated with the filter body;
    c) a first opening, formed in the filter body, with an inner peripheral edge sized and shaped to seal about the outlet pipe; and
    d) an outer peripheral edge sized and shaped to seal against the cavity wall; and
    e) the filter body being sized and shaped to extend across the cavity of the valve between the inlet pipe and the valve wall.

3. A method in accordance with claim 2, wherein the step of positioning the filter further includes positioning a filter having:
    a) a tubular shell;
    b) a second opening, formed in the upper end of the shell, larger than the first opening and sized and shaped to seal against the valve wall of the cavity.

4. A method in accordance with claim 3, wherein the step of positioning the filter further includes positioning a filter with a frusto-conical shape.

5. A method in accordance with claim 1, wherein the step of sealing the filter around the outlet pipe of the valve further includes sealing with an inner seal formed around an inner peripheral edge, the inner seal including a flexible material; and wherein the step of sealing the filter against the valve wall further includes sealing with an outer seal formed around an outer peripheral edge, the outer seal including a flexible material.

6. A method in accordance with claim 1, wherein the step of positioning the filter further includes positioning a filter having:
    a) an inner ring;
    b) an outer ring;
    c) a mesh material disposed between the rings;
    d) a seam formed by opposing edges of the mesh material; and e) a rib, extending between the inner and outer rings, and closing the seam.

7. A filter device for a flush valve with a cavity formed between a valve wall, an inlet into the cavity, and an outlet pipe disposed in the cavity, comprising:
   a) a filter body, configured to be disposed in the cavity of the valve between the inlet and the outlet pipe;
   b) a mesh material, disposed in the filter body;
   c) a first opening, formed in the filter body, with an inner peripheral edge sized and shaped to seal about the outlet pipe; and
   d) an outer peripheral edge sized and shaped to seal against the cavity wall; and
   e) the filter body being sized and shaped to extend across the cavity of the valve between the inlet pipe and the valve wall.

8. A device in accordance with claim 7, wherein the filter body further includes:
   a) a tubular shell sized and shaped to fit in the cavity and around the outlet pipe;
   b) a second opening, formed in the upper end of the shell, larger than the first opening and sized and shaped to seal against the valve wall of the cavity.

9. A device in accordance with claim 8, wherein the tubular shell has a frusto-conical conical shape.

10. A device in accordance with claim 7, further comprising an inner seal, disposed around the inner peripheral edge, formed of a flexible material.

11. A device in accordance with claim 7, further comprising an outer seal, disposed around the outer peripheral edge, formed of a flexible material.

12. A device in accordance with claim 7, wherein the filter body further includes:
   a) an inner ring with the first opening formed therein; and
   b) an outer ring forming the outer peripheral edge; and wherein the mesh material is disposed between the inner and outer rings.

13. A device in accordance with claim 12, further comprising:
   a) a seam formed by opposing edges of the mesh material; and
   b) a rib, extending between the inner and outer rings, and closing the seam.

14. A device in accordance with claim 7, further comprising a flush valve, configured to be coupled between a water source and a urinal, the flush valve including:
   a) a valve body having a valve wall, a cavity therein, an inlet extending through the valve wall into the cavity, and an outlet pipe disposed in the cavity with an abutment edge; and
   b) a diaphragm assembly, movably disposed in the cavity of the valve body, including a portion movably between 1) a closed position in which the portion is disposed against the abutment edge of the outlet pipe, and 2) an open position in which the portion is disposed away from the abutment edge of the outlet pipe.

15. A flush valve device, comprising:
   a) a valve body having a valve wall, a cavity therein, an inlet extending through the valve wall into the cavity, and an outlet pipe disposed in the cavity with an abutment edge;
   b) a diaphragm assembly, movably disposed in the cavity of the valve body, including a portion movably between 1) a closed position in which the portion is disposed against the abutment edge of the outlet pipe, and 2) an open position in which the portion is disposed away from the abutment edge of the outlet pipe; and
   c) a filter, disposed in the cavity of the valve body between the inlet and the outlet pipe, spanning an entire span between the outlet pipe and the valve wall, including:
      i) a tubular shell sized and shaped to fit in the cavity and around the outlet pipe;
      ii) a mesh material, associated with the tubular shell;
      iii) a lower opening, formed in a lower end of the tubular shell, with an inner peripheral edge sealed about the outlet pipe; and
      iv) an upper opening, formed in an upper end of the tubular shell, with an outer peripheral edge sealed against the cavity wall.

16. A device in accordance with claim 15, wherein the tubular shell has a frusto-conical shape.

17. A device in accordance with claim 15, further comprising an inner seal, disposed around the inner peripheral edge, formed of a flexible material.

18. A device in accordance with claim 15, further comprising an outer seal, disposed around the outer peripheral edge, formed of a flexible material.

19. A device in accordance with claim 15, wherein the filter further includes:
   a) an inner ring with the first opening formed therein; and
   b) an outer ring forming the outer peripheral edge; and wherein the mesh material is disposed between the inner and outer rings.

20. A device in accordance with claim 19, further comprising:
   a) a seam formed by opposing edges of the mesh material; and
   b) a rib, extending between the inner and outer rings, and closing the seam.

21. A device in accordance with claim 15, wherein the valve body and diaphragm assembly form at least part of a flush valve, and are configured to be coupled between a water supply and a urinal.

* * * * *